(12) United States Patent
Pasolini et al.

(10) Patent No.: US 10,006,931 B2
(45) Date of Patent: *Jun. 26, 2018

(54) INERTIAL DEVICE WITH PEDOMETER FUNCTION AND PORTABLE ELECTRIC APPLIANCE INCORPORATING SAID INERTIAL DEVICE

(71) Applicant: STMicroelectronics S.r.l., Agrate Brianza (IT)

(72) Inventors: Fabio Pasolini, San Martino Siccomario (IT); Michele Tronconi, San Martino Siccomario (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 281 days.

This patent is subject to a terminal disclaimer.

(21) Appl. No.: 14/521,140

(22) Filed: Oct. 22, 2014

(65) Prior Publication Data

US 2015/0040668 A1    Feb. 12, 2015

Related U.S. Application Data

(63) Continuation of application No. 13/176,675, filed on Jul. 5, 2011, now Pat. No. 8,875,573, which is a (Continued)

(30) Foreign Application Priority Data

Jan. 30, 2006    (EP) .................................... 06425041

(51) Int. Cl.
*G01P 15/00*    (2006.01)
*G01C 22/00*    (2006.01)
*G01P 15/125*    (2006.01)

(52) U.S. Cl.
CPC .......... *G01P 15/125* (2013.01); *G01C 22/006* (2013.01)

(58) Field of Classification Search
CPC ............................ G01P 15/125; G01C 22/006
(Continued)

(56) References Cited

U.S. PATENT DOCUMENTS 4,651,446 A * 3/1987 Yukawa ................... A43B 3/00
                                                                235/105
4,962,469 A * 10/1990 Ono ....................... G01C 22/006
                                                                235/105
(Continued)

FOREIGN PATENT DOCUMENTS

JP    58-54489 A    3/1983
JP    200-176900 A    6/2000
(Continued)

OTHER PUBLICATIONS

"Precision ± 1.7 g Single/Dual Axis Accelerometer," Analog Devices, ADXL103/ADXL203, Rev. 0, 2004, 12 pages.
(Continued)

*Primary Examiner* — Helen Kwok
(74) *Attorney, Agent, or Firm* — SEED IP Law Group LLP

(57) ABSTRACT

An inertial device that is integratable in a portable electronic device includes: an inertial sensor for generating at least one raw acceleration signal in response to accelerations caused by movements of walking and running of a user of the pedometer; and a processing unit, associated to the inertial sensor for counting a number of steps of the user of the pedometer on the basis of the raw acceleration signal. The inertial sensor and the processing unit are both encapsulated within a single package for integrated circuits, which can be coupled to a circuit board of an electronic device and is
(Continued)

provided with at least one connection terminal for making the number of steps available to the outside world.

21 Claims, 6 Drawing Sheets

Related U.S. Application Data continuation of application No. 11/669,096, filed on Jan. 30, 2007, now Pat. No. 8,042,390.

(58) Field of Classification Search
USPC ........... 73/493, 489–492; 702/160, 176, 178, 702/141, 150–154, 158
See application file for complete search history.

(56) References Cited

U.S. PATENT DOCUMENTS

| | | | |
|---|---|---|---|
| 5,426,595 A | 6/1995 | Picard | |
| 6,052,654 A | 4/2000 | Gaudet et al. | |
| 6,135,951 A * | 10/2000 | Richardson | A61B 5/0245 482/8 |
| 6,145,389 A * | 11/2000 | Ebeling | G01C 22/006 73/865.4 |
| 6,323,807 B1 * | 11/2001 | Golding | G01C 21/20 342/419 |
| 6,546,336 B1 * | 4/2003 | Matsuoka | G01C 22/006 701/408 |
| 6,591,678 B2 * | 7/2003 | Sakai | B60R 21/0132 73/514.32 |
| 6,790,178 B1 * | 9/2004 | Mault | A61B 5/0011 128/903 |
| 6,891,239 B2 * | 5/2005 | Anderson | B81B 7/007 257/414 |
| 6,898,550 B1 | 5/2005 | Blackadar et al. | |
| 6,927,098 B2 | 8/2005 | DCamp et al. | |
| 7,040,166 B2 | 5/2006 | Babala | |
| 7,040,922 B2 * | 5/2006 | Harney | G01C 21/16 361/810 |
| 7,212,943 B2 * | 5/2007 | Aoshima | G01C 22/006 702/141 |
| 7,237,446 B2 * | 7/2007 | Chan | A63B 69/0028 73/509 |
| 7,246,033 B1 * | 7/2007 | Kudo | G01C 22/006 702/153 |
| 7,297,088 B2 * | 11/2007 | Tsuji | G01C 22/006 377/24.2 |
| 7,463,997 B2 | 12/2008 | Pasolini et al. | |
| 7,578,184 B2 | 8/2009 | Fontanella et al. | |
| 7,608,050 B2 * | 10/2009 | Shugg | 235/105 |
| 7,672,806 B2 * | 3/2010 | Tronconi | G01P 15/0891 345/156 |
| 7,698,097 B2 * | 4/2010 | Pasolini | G01C 22/006 377/24.2 |
| 7,717,866 B2 * | 5/2010 | Damen | A61B 5/222 600/595 |
| 7,753,861 B1 * | 7/2010 | Kahn | A61B 5/1118 482/8 |
| 7,970,568 B1 * | 6/2011 | Schabowski | G01C 22/006 702/116 |
| 8,021,312 B2 * | 9/2011 | Kinnunen | A61B 5/1118 235/105 |
| 8,042,390 B2 * | 10/2011 | Pasolini | G01P 15/125 702/160 |
| 8,875,573 B2 * | 11/2014 | Pasolini | G01P 15/125 702/160 |
| 2002/0013717 A1 * | 1/2002 | Ando | A61B 5/0002 705/4 |
| 2002/0118121 A1 * | 8/2002 | Lehrman | A61B 5/0205 340/870.16 |
| 2005/0093868 A1 * | 5/2005 | Hinckley | G06F 3/011 345/502 |
| 2005/0240375 A1 * | 10/2005 | Sugai | G01P 3/50 702/160 |
| 2006/0020177 A1 * | 1/2006 | Seo | A61B 5/222 600/300 |
| 2006/0100817 A1 * | 5/2006 | You | G01C 22/006 702/141 |
| 2006/0217231 A1 * | 9/2006 | Parks | A63B 69/0028 482/3 |
| 2006/0235472 A1 * | 10/2006 | Goetz | A61N 1/36135 607/2 |
| 2007/0021269 A1 * | 1/2007 | Shum | A61B 5/11 482/8 |

FOREIGN PATENT DOCUMENTS

| | | |
|---|---|---|
| JP | 2001-272413 A | 10/2001 |
| JP | 2004-81274 A | 3/2004 |
| JP | 2005-500540 A | 1/2005 |
| JP | 2005-033524 A | 2/2005 |
| JP | 2005-257637 A | 9/2005 |
| JP | 2005-286809 A | 10/2005 |
| JP | 2007-500086 A | 1/2007 |

OTHER PUBLICATIONS

"Small, Low Power, 3-Axis ±3 g, iMEMS® Accelerometer," Analog Devices, ADXL330, Rev. A, 16 pages, 2006.
Morizio, "Fabrication and Manufacturing (Basics)," EE 261, URL=http://people.ee.duke.edu/~jmorizio/ece261/classlectures/Fabrication.pdf, download date Apr. 26, 2017, 56 pages.
Srinivasan, "MEMS Fabrication 1: Process Flows and Bulk Micromachining," Lecture 2, EE C245, URL=http://www-bsac.eecs.berkeley.edu/projects/ee245/Lectures/lecturepdfs/Lecture2.BulkMicromachining.pdf, download date Apr. 26, 2017, 23 pages.

* cited by examiner

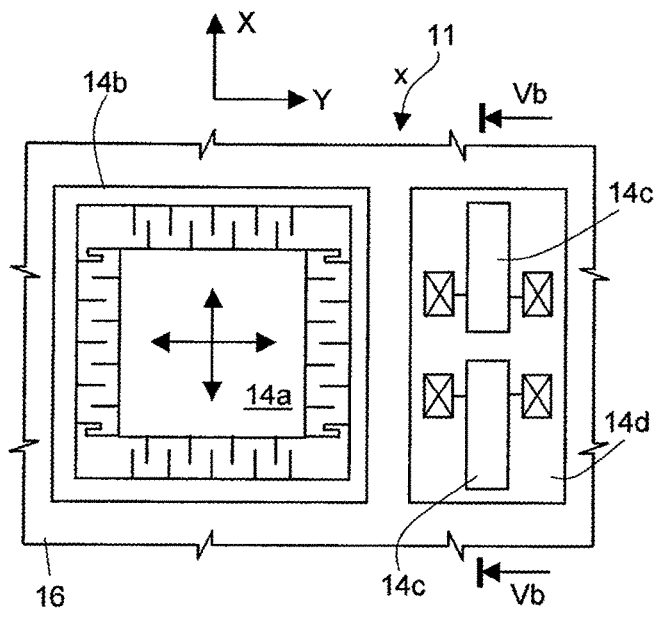
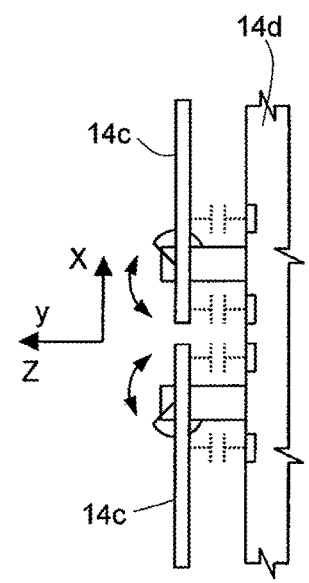
Fig.5a  Fig.5b
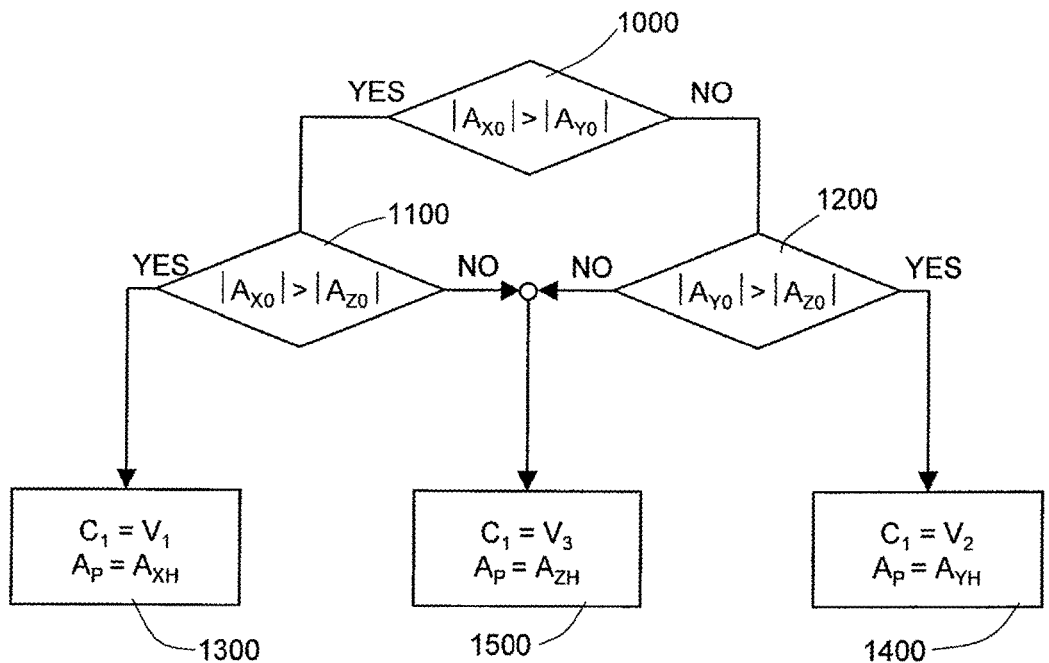
Fig.8

INERTIAL DEVICE WITH PEDOMETER FUNCTION AND PORTABLE ELECTRIC APPLIANCE INCORPORATING SAID INERTIAL DEVICE

CROSS-REFERENCE TO RELATED APPLICATIONS

This application is a continuation of U.S. patent application Ser. No. 13/176,675, filed Jul. 5, 2011, now pending, which is a continuation of U.S. patent application Ser. No. 11/669,096, filed Jan. 30, 2007, now issued U.S. Pat. No. 8,042,390 all applications are incorporated herein by reference in their entirety.

BACKGROUND OF THE INVENTION

Field of the Invention

The present invention relates to an inertial device with the pedometer function and to a portable electric appliance incorporating said inertial device.

Description of the Related Art

As is known, a pedometer is a device that can be worn by a user and has the function of counting the number of steps during various forms of walking or running, for consequently estimating the distance covered. The indications provided are useful both for quantifying the motor activity performed by an individual in the course of a given period, for example for clinical purposes, and for evaluating performance in sport or even just for personal interest. Basically, a pedometer comprises a movement sensor, for detecting movements due to walking of a user, a control unit, which processes signals supplied by the movement sensor for counting the number of steps made, and a display, on which the important information is displayed. The elements that make up the pedometer are generally assembled on a board, which is in turn housed in a casing.

The growing interest for pedometers, the modest dimensions, and the relatively contained production cost have pushed manufacturers of different portable electronic devices to integrate in their own products also the pedometer function. In particular, some portable electronic devices are very well suited to integration of a pedometer, because they already comprise, for other purposes, some pedometer components. For example, cell phones and palmtops are always provided with a microprocessor that performs numerous control functions. Increasingly frequently, moreover, the same devices also include an inertial sensor, which, among other things, can be used for the purpose of detecting and recording traumatic events, such as impact and falls, or else for detecting states of prolonged rest, in which the devices are presumably unused and can be set in a low-consumption wait state or stand-by mode.

The integration of a pedometer poses, however, some problems. In fact, the procedures used for counting the steps become progressively more sophisticated and require a growing processing capacity, also because they are continuously executed for prolonged periods. For instance, the signal coming from the movement sensor is filtered and subjected to further processing to prevent events not correlated to walking from falsifying counting of the steps. On the other hand, the microprocessor executes the majority of the functions envisaged for the portable device, in addition to serving as control unit of the pedometer. Conflicts may thus arise, especially when the microprocessor is intensively exploited for other reasons (for example, for the reproduction of a digital film).

BRIEF SUMMARY OF THE INVENTION

One embodiment of the present invention is an inertial device with pedometer function and a portable electronic appliance that enable the limitations described above to be overcome.

One embodiment of the present invention is an inertial device with pedometer function.

BRIEF DESCRIPTION OF THE SEVERAL VIEWS OF THE DRAWINGS

For a better understanding of the invention, there are now described some embodiments thereof, purely by way of non-limiting example and with reference to the attached drawings, wherein:

FIG. 5a is a front view of a part of the inertial device of FIG. 1, further enlarged and sectioned along the line Va-Va of FIG. 4;

FIG. 5b is a cross section through the inertial device of FIG. 1, taken along the line Vb-Vb of FIG. 5a;

FIG. 8 is a flowchart regarding a procedure executed by the first circuit of FIG. 7;

DETAILED DESCRIPTION OF THE INVENTION

Figure 1:
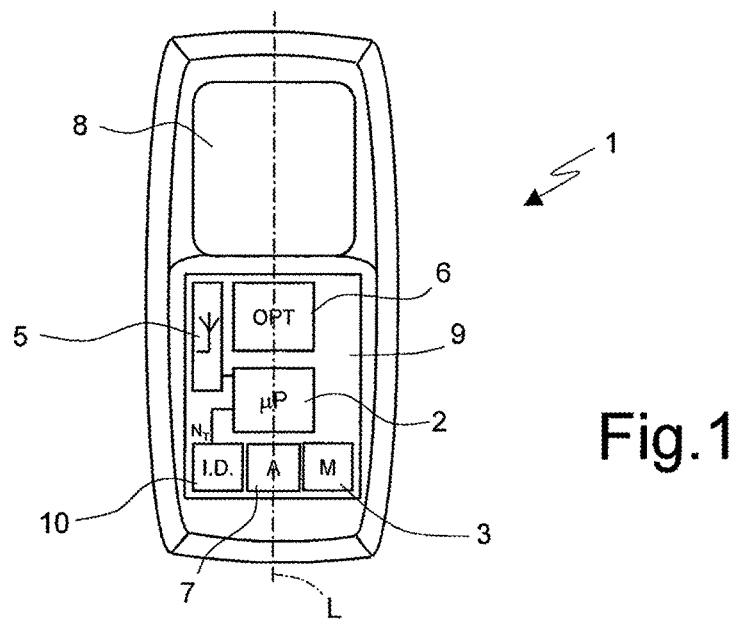
FIG. 1 shows a simplified and partially sectioned front view of a portable electronic appliance incorporating an inertial device with pedometer function provided in accordance with a first embodiment of the present invention.
Figure 2:
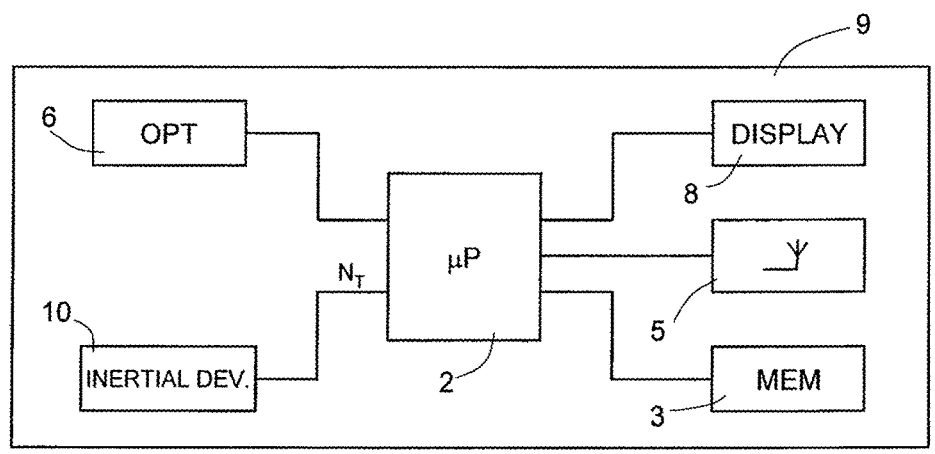
FIG. 2 shows a block diagram of the portable electronic appliance of FIG. 1.

With reference to FIGS. 1 and 2, a portable electronic appliance, herein a cell phone 1, comprises: a microprocessor 2; volatile and not volatile memory banks 3; a receiving/transmitting circuit 5; an image sensor 6, coupled in a known way to optics (herein not illustrated); and a display 8. The components listed above are mounted on a circuit board 9 (not necessarily on one and the same face of the latter) and are connected to one another in a known way for providing conventional functions in cell phones. The circuit board 9, which has a longitudinal axis L, is in turn housed within a casing 4 of the cell phone 1.

Furthermore, the cell phone 1 incorporates an inertial device 10, which is also connected to the microprocessor 2 and selectively activatable by the latter. When active, the inertial device 10 supplies to the microprocessor 2 a first numeric acceleration signal $A_X$, a second numeric acceleration signal $A_Y$, and a third numeric acceleration signal $A_Z$ (as explained in detail hereinafter), in a numeric format that is directly usable by the microprocessor 2 itself. The inertial device 10 is moreover configured to operate autonomously as pedometer, counts a total number of steps $N_T$ of a user, and supplies it to the microprocessor 2, once again in the same numeric format. Preferably, the inertial device 10 can generate internally and supply to the microprocessor 2 also other data regarding the gait of the user, such as, for example, an estimated speed, a total distance covered, an estimated energy consumption, and the like.

Figure 3:
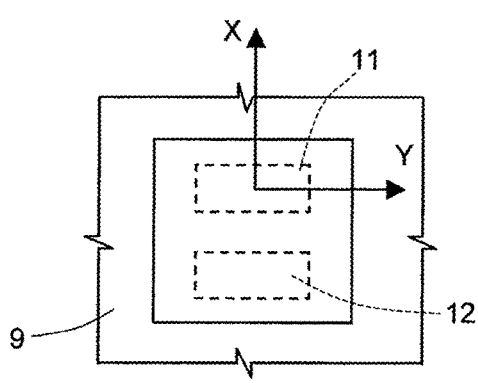
FIG. 3 is an enlarged front view of the inertial device of FIG. 1.
Figure 4:
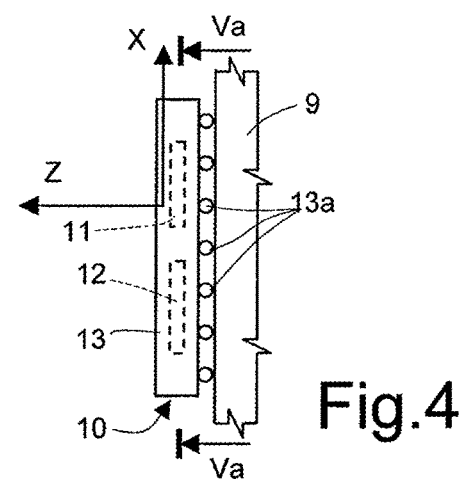
FIG. 4 is an enlarged right side view of the inertial device of FIG. 1.

The inertial device 10 includes an inertial sensor 11 and a processing unit 12, both encapsulated within a single package 13 for integrated circuits, as illustrated in FIGS. 3 and 4. The package 13 is preferably of the BGA ("Ball Grid Array") or LGA ("Land Grid Array") type and is soldered on the circuit board 9, herein by means of bumpers, which function as connection terminals 13a (FIG. 4) for coupling the inertial device 10 to the other components of the cell phone 1 (in particular, to the microprocessor 2).

The inertial sensor 11 is preferably of the capacitive microelectromechanical (or MEMS, Micro-Electro-Mechanical System) type, having a first detection axis X, a second detection axis Y, and a third detection axis Z, which are mutually perpendicular and independent. When the inertial sensor 11 is mounted on the board 9, the first detection axis X is parallel to the longitudinal axis L of the board 9, the second detection axis Y is parallel to the surface of the board 9 and perpendicular to the first detection axis X, and the third detection axis Z is perpendicular to the other two axes. The inertial sensor 11 comprises microelectromechanical structures having movable parts elastically constrained to fixed parts. In the embodiment described herein, in particular, the sensor 11 comprises: a biaxial linear accelerometer with comb-fingered electrodes (FIG. 5a), having a movable mass 14a translatable along the first axis X and the second axis Y with respect to a fixed body 14b; and a single-axis accelerometer (see also FIG. 5b) with hinged beams 14c oscillating with respect to a fixed body 14d, for detecting accelerations along the third detection axis Z. In this way, the inertial sensor 11 can advantageously be provided in a single first semiconductor chip 16a (see also FIG. 6).

Figure 6:
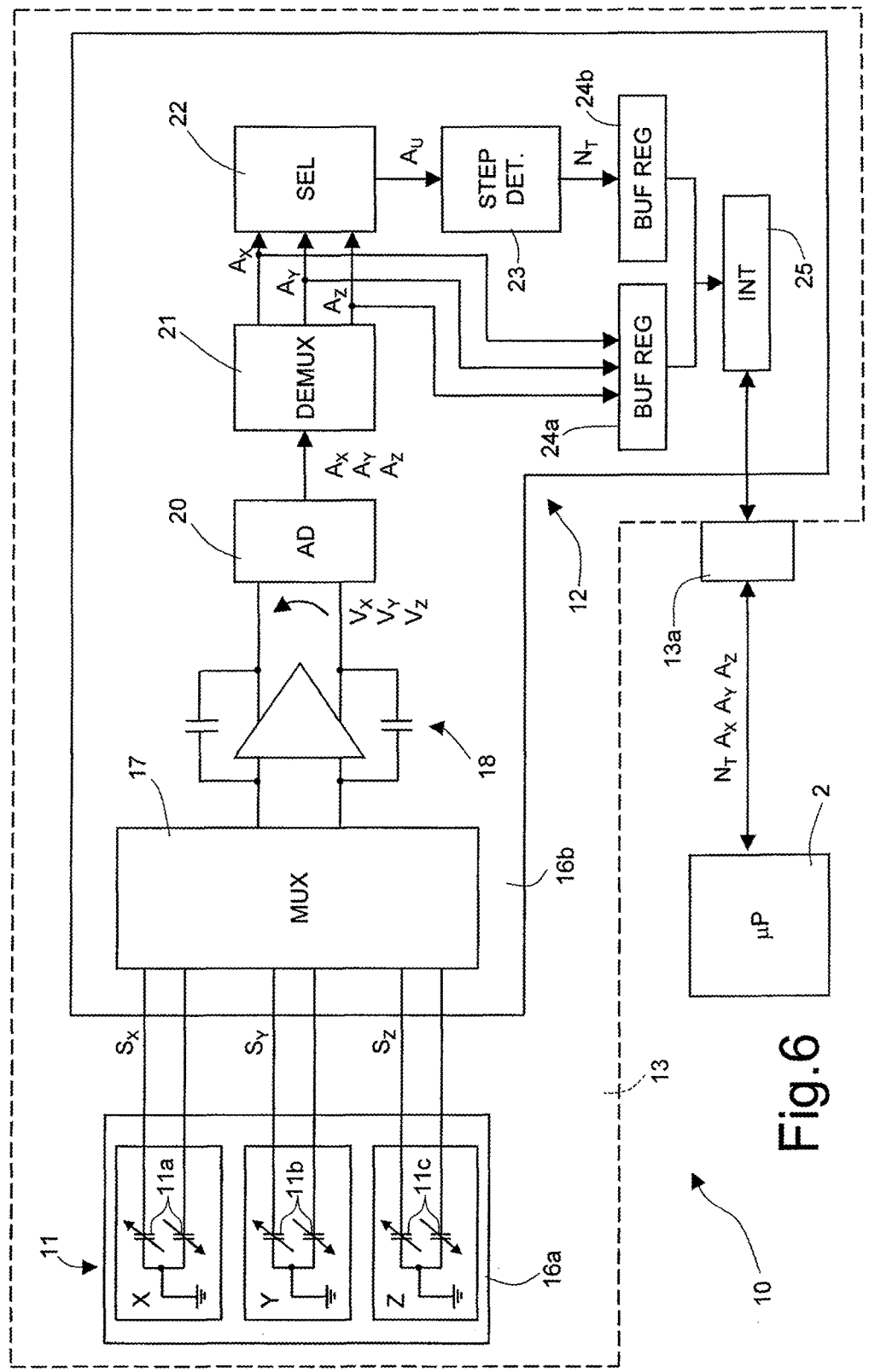
FIG. 6 is a simplified block diagram of the inertial device of FIG. 1.

With reference to FIG. 6, the movable parts and the fixed parts of the inertial sensor 11 define a first pair of capacitors 11a, a second pair of capacitors 11b, and a third pair of capacitors 11c having variable capacitance in response to forces and accelerations acting on the inertial sensor 11, respectively, along the first, second and third detection axes X, Y, Z. The capacitance variations of the first, second, and third pairs of capacitors 11a, 11b, 11c are moreover of a differential type.

The inertial sensor 11 supplies to the control unit a first raw acceleration signal $S_X$, a second raw acceleration signal $S_Y$, and a third raw acceleration signal $S_Z$, respectively, determined by the capacitance variations of the first, second, and third pairs of capacitors 11a, 11b, 11c and hence correlated to the accelerations detected, respectively, along the first, second, and third detection axes X, Y, Z. In the embodiment described herein, the first, second, and third raw acceleration signals $S_X$, $S_Y$, $S_Z$ are in the form of charge packets, which are transferred independently from the first, second, and third pairs of capacitors 11a, 11b, 11c to respective inputs of the processing unit 12.

The processing unit 12 is provided in a single second semiconductor chip 16b, obviously separate from the microprocessor 2, and is configured so as to execute a counting procedure of the steps based upon the first, second, and third raw acceleration signals $S_X$, $S_Y$, $S_Z$, previously processed, as explained hereinafter.

In detail (FIG. 6), the processing unit 12 comprises a multiplexer 17, a charge integrator 18, an analog-to-digital (A/D) converter 20, a demultiplexer 21, a selection circuit 22, a detection circuit 23, a first buffer register 24a and a second buffer register 24b, and a communication interface 25. In the embodiment of the invention herein described, all the functions performed by the processing unit 12 are provided completely in hardware, i.e., by means of respective dedicated analog or digital circuits.

The charge integrator 18, which functions as reading interface of the inertial sensor 11, is a charge-voltage converter and includes a fully differential operational amplifier, the inputs whereof are cyclically connected to the first, second, and third pairs of capacitors 11a, 11b, 11c through the multiplexer 17. Consequently, the charge integrator 18 is used in time-division for converting the first, second, and third raw acceleration signals $S_X$, $S_Y$, $S_Z$ cyclically into a first voltage $V_X$, a second voltage $V_Y$, and a third voltage $V_Z$, of an analog type.

The outputs of the charge amplifier 18 are connected to the A/D converter 20 that samples the first, second, and third voltages $V_X$, $V_Y$, $V_Z$, for generating, respectively, the first, second, and third numeric acceleration signals $A_X$, $A_Y$, $A_Z$. The sequential output of the A/D converter 20 is connected to the demultiplexer 21, which supplies the first, second, and third numeric acceleration signals $A_X$, $A_Y$, $A_Z$ to the selection circuit 22 in parallel over three independent lines. The first, second, and third numeric acceleration signals $A_X$, $A_Y$, $A_Z$ are also loaded in the first buffer register 24a so as to be made available to the microprocessor 2.

The selection circuit 22 and the detection circuit 23 process the first, second, and third numeric acceleration signals $A_X$, $A_Y$, $A_Z$, as explained hereinafter for detecting events identifiable as user's steps and for updating the total number of steps $N_T$. The output of the detection circuit 23 is connected to the second buffer register 24b, where the total number of steps $N_T$ is temporarily stored and made available to the outside to be sent to the microprocessor 2 through the communication interface 25 and a connection terminal 13a of the package 13.

Figure 7:
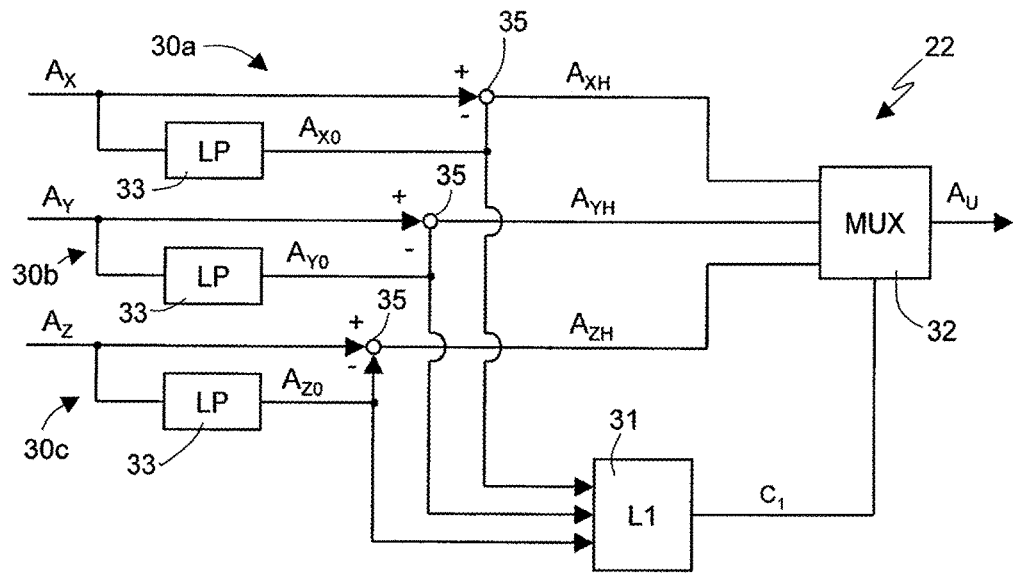
FIG. 7 is a more detailed block diagram of a first circuit included in the inertial device of FIG. 1.

As illustrated in FIG. 7, the selection circuit 22 receives from the demultiplexer 21 the first, second, and third numeric acceleration signals $A_X$, $A_Y$, $A_Z$ and generates a usable acceleration signal $A_U$, which corresponds substantially to the a.c. component of one from among the first, second, and third numeric acceleration signals $A_X$, $A_Y$, $A_Z$ and precisely that having the largest d.c. component in absolute value. In greater detail, the selection circuit 22 comprises a first processing line 30a, a second processing line 30b, and a third processing line 30c, a first logic circuit 31, and a multiplexer 32. The first, second, and third processing lines 30a, 30b, 30c each comprise a respective lowpass filter 33 and a respective subtractor node 35. More precisely, the lowpass filters 33 of the first, second, and third processing lines 30a, 30b, 30c receive, respectively, the first, second, and third numeric acceleration signals $A_X$, $A_Y$, $A_Z$ at their inputs and have outputs connected to negative inputs of the respective subtractor nodes 35 and, moreover, to respective inputs of the first logic circuit 31. The lowpass filters 33 are configured so as to extract substantially respective d.c. components $A_{X0}$, $A_{Y0}$, $A_{Z0}$ of the first, second, and third numeric acceleration signals $A_X$, $A_Y$, $A_Z$. The first, second, and third numeric acceleration signals $A_X$, $A_Y$, $A_Z$ are moreover directly supplied to positive inputs of the subtractor nodes 35, respectively, of the first, second, and third processing lines 30a, 30b, 30c. On the outputs of the subtractor nodes 35 there are thus a.c. components $A_{XH}$, $A_{YH}$, $A_{ZH}$, respectively, of the first, second, and third numeric acceleration signals $A_X$, $A_Y$, $A_Z$ ($A_{XH}=A_X-A_{X0}$; $A_{YH}=A_Y-A_{Y0}$; $A_{ZH}=A_Z-A_{Z}$). Furthermore, the outputs of the subtractor nodes 35 are connected to respective data inputs of the multiplexer 32, which has a further selection input, connected to the output of the first logic circuit 31 for receiving a first control signal $C_1$. The output of the multiplexer 32 supplies the usable acceleration signal $A_U$.

The first logic circuit 31 controls the multiplexer 32 by means of the first control signal $C_1$ so that the usable acceleration signal $A_U$ on the output of the multiplexer 32 corresponds to the a.c. component $A_{XH}$, $A_{YH}$, $A_{ZH}$ of that signal between the first, second, and third numeric acceleration signals $A_X$, $A_Y$, $A_Z$ that has the d.c. largest component $A_{X0}$, $A_{Y0}$, $A_{Z0}$ in absolute value. In this way, in practice, there is always used the acceleration signal corresponding to the detection axis nearest to the vertical and hence most sensitive to the accelerations caused by walking of the user (in fact, the d.c. component of the acceleration signal associated to a detection axis of a generic inertial sensor is basically determined by the contribution of the acceleration of gravity along that axis). The multiplexer 17, the charge integrator 18, the A/D converter 20, the demultiplexer 21, and the selection circuit 22 form in practice a conversion chain that extracts the usable acceleration signal $A_U$ starting from the first, second, and third raw acceleration signals $S_X$, $S_Y$, $S_Z$.

In greater detail, the first logic circuit 31 executes the procedure illustrated in FIG. 8. Initially, the numeric acceleration signal $A_X$, $A_Y$, $A_Z$ that has the largest d.c. component in absolute value is selected. For this purpose, the absolute value of the d.c. component $A_{X0}$ of the first numeric acceleration signal $A_X$ is compared with the absolute value of the d.c. component $A_{Y0}$ of the second numeric acceleration signal $A_Y$ (block 1000, test: "$|A_{X0}|>|A_{Y0}|$?"). Thus, the largest d.c. component $A_{X0}$, $A_{Y0}$ in absolute value is compared with the absolute value of the d.c. component $A_{Z0}$ of the third numeric acceleration signal $A_Z$ (output YES from block 1000 and block 1100, if $|A_{X0}|>|A_{Y0}|$, test: "$|A_{X0}|>|A_{Z0}|$?"; output NO from block 1000 and block 1200, if $|A_{X0}|<|A_{Y0}|$, test: "$|A_{Y0}|>|A_{Z0}|$?"). According to whether the d.c. component $A_{X0}$ of the first numeric acceleration signal $A_X$, the d.c. component $A_{Y0}$ of the second numeric acceleration signal $A_Y$, or the d.c. component $A_{Z0}$ of the third numeric acceleration signal $A_Z$ is the largest in absolute value, a first value $V_1$ (block 1300), a second value $V_2$ (block 1400), or a third value $V_3$ is respectively assigned to the control signal $C_1$ (block 1500). In the first case ($C_1=V_1$), the multiplexer 32 is controlled so as to connect its output to the subtractor node 35 of the first processing line 30a; hence, the usable acceleration signal $A_U$ is equal to the a.c. component $A_{XH}$ of the first numeric acceleration signal $A_X$ ($A_U=A_{XH}$). In the second case ($C_1=V_2$), the multiplexer 32 is controlled so as to connect its output to the subtractor node 35 of the second processing line 30b; hence, the usable acceleration signal $A_U$ is equal to the a.c. component $A_{YH}$ of the second numeric acceleration signal $A_Y$ ($A_U=A_{YH}$). In the third case ($C_1=V_3$), the multiplexer 32 is controlled so as to connect its output to the subtractor node 35 of the third processing line 30c; hence, the usable acceleration signal $A_U$ is equal to the a.c. component $A_{ZH}$ of the third numeric acceleration signal $A_Z$ ($A_U=A_{ZH}$).

Figure 9:
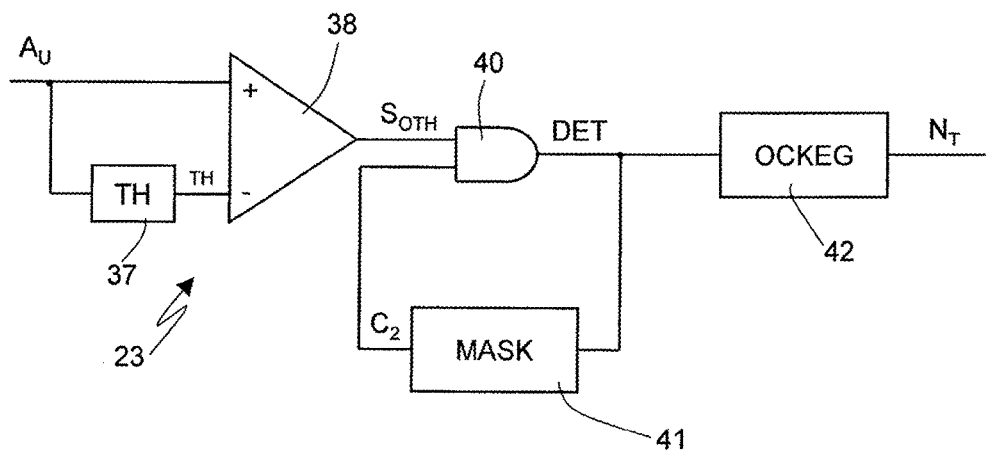
FIG. 9 is a more detailed block diagram of a second circuit included in the inertial device of FIG. 1.

With reference to FIG. 9, the detection circuit 23 uses the usable acceleration signal $A_U$ to identify waveforms corresponding to patterns associated to a step of the user and, whenever a step is detected, increments the total number of steps $N_T$.

In detail, the detection circuit 23 comprises a threshold-updating circuit 37, a comparator 38, an enabling gate 40, a masking circuit 41, and an output counter register 42. The comparator 38 receives the usable acceleration signal $A_U$ on a non-inverting input and a threshold value TH on an inverting input. The threshold value TH is generated by the threshold-updating circuit 37 on the basis of the usable acceleration signal $A_U$, supplied to its input. The output of the comparator 38 is connected to an input of the enabling gate 40 (herein an AND type logic gate) and supplies a threshold-exceeding signal $S_{OTH}$ of a logic type, having a first value when the usable acceleration signal $A_U$ is greater than the threshold value TH, and a second value otherwise. The enabling gate 40 has a further input connected to an output of the masking circuit 41 and an output connected to a counting input of the output counter register 42 and to an input of the masking circuit 41. A step-detection signal DET is present on the output of the enabling gate 40. The output counter register 42 contains the total number of steps $N_T$, and its output forms the output of the detection circuit 23. As explained hereinafter, the masking circuit 41 generates a second control signal $C_2$ on the basis of the step-detection signal DET. The second control signal $C_2$ is supplied to the enabling gate 40 and has an enabling value, which enables the transfer of the threshold-exceeding signal $S_{OTH}$ on the output of the enabling gate 40, and a disabling value, which blocks the disabling gate 40.

The detection circuit 23 operates in the way described hereinafter. The usable acceleration signal $A_U$ is normally lower than the threshold value TH and exceeds it upon setting the foot down to ground, when the user is walking or running. Fundamentally, then, a step of the user is detected when the usable acceleration signal $A_U$ exceeds the threshold value TH. When this occurs, the threshold-exceeding signal $S_{OTH}$ switches, and its value is transferred onto the output of the enabling gate 40 (the second control signal $C_2$ normally has the enabling value). Also the step-detection signal DET is enabled to switch to a detection value and increments the content of the output counter register, i.e., the total number of steps $N_T$. However, as soon as the step-detection signal DET switches to the detection value, the masking circuit 41 sends the second control signal $C_2$ to the disabling value and blocks the enabling gate 40 for a masking time interval of pre-determined duration. In practice, the enabling gate 40 and the masking circuit 41 selectively enable updating of the total number of steps $N_T$ contained in the output counter register 42, when the usable acceleration signal $A_U$ is lower than the threshold value TH, and disable it temporarily for the duration of the masking interval, following upon exceeding of the threshold value TH by the usable acceleration signal $A_U$. In the masking interval, then, the detection of further steps is inhibited in order to prevent false counts.

Figure 10:
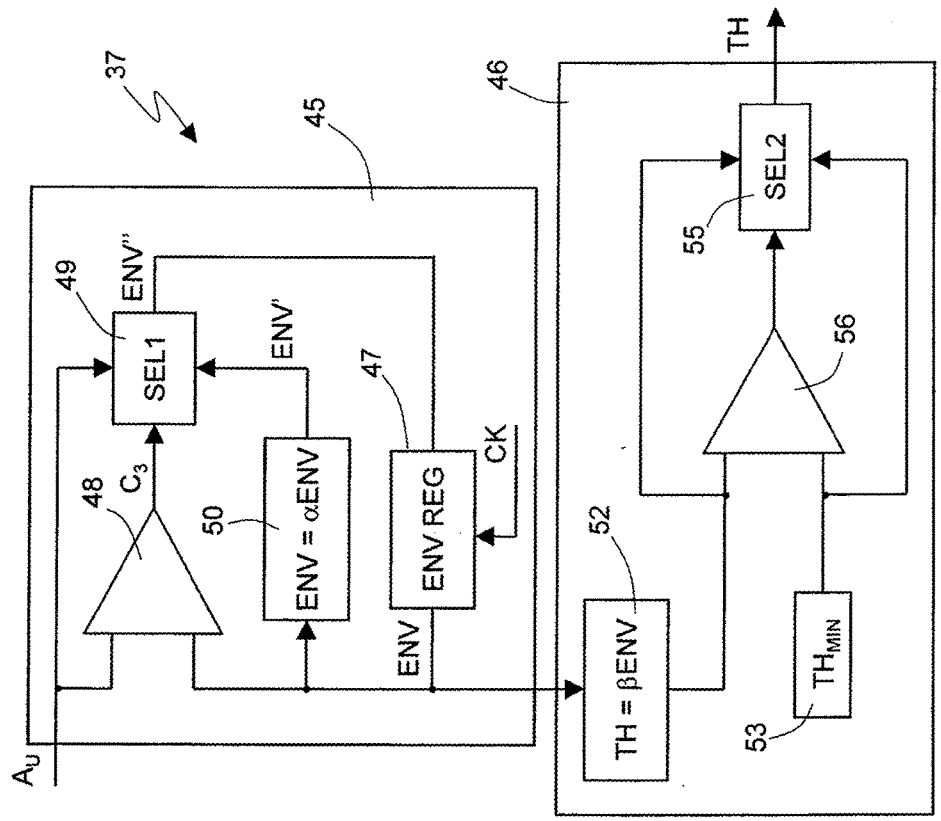
FIG. 10 is a more detailed block diagram of a first part of the second circuit of FIG. 9.

FIG. 10 illustrates in detail the threshold-updating circuit 37, which comprises an envelope detector 45 and a threshold-calculation stage 46.

In the embodiment described, the envelope detector 45 comprises an envelope register 47, an envelope comparator 48, a first selector circuit 49, and a first multiplier circuit 50. The envelope register 47 is timed in a known way by a clock signal CK and, at each cycle of the clock signal CK, supplies on its output a (numeric) current envelope value ENV of the usable acceleration signal $A_U$. The envelope comparator 48 receives on its inputs the usable acceleration signal $A_U$ and the current envelope value ENV and generates a third control signal $C_3$, of a logic type, which is supplied to a control input of the first selector circuit 49. On respective data inputs, the first selector circuit 48 receives the usable acceleration signal $A_U$ and an attenuated envelope value ENV' generated by the first multiplier circuit 50. In practice, the first multiplier circuit 50 receives the current envelope value ENV from the envelope register 47 and multiplies it by an attenuation factor (smaller than 1). The output of the first selector circuit 50 supplies an updated envelope value ENV", which is stored in the envelope register 47 at a subsequent cycle of the clock signal CK. The first selector circuit 48 is controlled by the envelope comparator 48 so that the updated envelope value ENV" is equal to the usable acceleration signal $A_U$, if the latter is greater than the current envelope value ENV, and equal to the attenuated envelope value ENV' otherwise.

The threshold-calculation stage 46 comprises: a second multiplier circuit 52, which receives the current envelope value ENV from the envelope register 47 and supplies a threshold value TH equal to a fraction of the current envelope value ENV itself; a minimum-threshold register 53, in which a minimum threshold value $TH_{MIN}$ is stored; a second selector circuit 55, having data inputs connected to the outputs of the second multiplier circuit 52 and of the minimum-threshold register 53; and a threshold comparator 56, which also has inputs connected to the outputs of the second multiplier circuit 52 and of the minimum-threshold register 53 and an output connected to a control input of the second selector circuit 55. In practice, the threshold comparator 56 controls the second selector circuit 55 so that the threshold value on its output is equal to the higher between the threshold value TH and the minimum threshold value $TH_{MIN}$. Consequently, the threshold value TH is adapted on the basis of the envelope of the usable acceleration signal $A_U$, but is never brought below the minimum threshold value $TH_{MIN}$.

Figure 11:
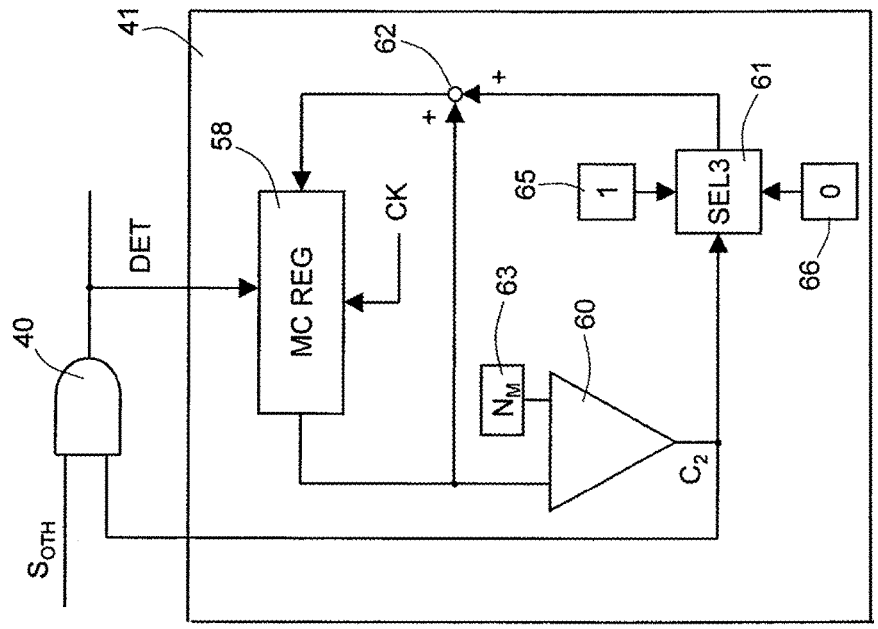
FIG. 11 is a more detailed diagram of a second part of the second circuit of FIG. 9.

Illustrated in FIG. 11, is a diagram with a detail of the masking circuit 41, which, in the embodiment of the invention described herein, comprises a masking counter register 58, a masking comparator 60, a third selector circuit 61, and an adder node 62. A reset input of the masking counter register 58 is connected to the output of the enabling gate 40 for receiving the step-detection signal DET. A timing input receives instead the clock signal CK. The output of the masking counter register 58 is connected to inputs of the masking comparator 60 and of the adder node 62. The masking comparator 60 receives on a further input a number of masking cycles $N_M$ (e.g., three) from a purposely provided programmable data register 63 and supplies on its output the second control signal $C_2$. In particular, the second control signal $C_2$ has the enabling value when the contents of the masking counter register 58 is equal to or higher than the number of masking cycles $N_M$, and the disabling value otherwise. The output of the masking comparator 60 is moreover connected to an input of the enabling gate 40 and to a control input of the third selector circuit 61. In turn, the third selector circuit 61 has data inputs connected to respective data registers 65, 66, in which the value "1" and the value "0" are stored, and an output connected to the adder node 62. The third selector circuit 61 is controlled by the masking comparator 60 by the second control signal $C_2$, so as to supply to the adder node 62 the value "0" and the value "1" when the second control signal $C_2$ has the enabling value and, respectively, the disabling value.

In practice, when the step-detection signal DET switches to the detection value, the masking counter register 58 is reset, and the second control signal $C_2$ assumes the disabling value, preventing the detection and counting of further steps. The masking counter register 58 is inserted in a counting loop, together with the adder node 62, and is incremented at each cycle by the clock signal CK until the second control signal $C_2$ maintains the disabling value (the adder node receives the value "1" from the third selector circuit 61 and adds it to the value on the output of the masking counter register 58). When the content of the masking counter register 58 reaches the number of masking cycles $N_M$, the second control signal $C_2$ returns to the disabling value and the detection of the steps is again enabled. Furthermore, the third selector circuit 61 is controlled so as to supply the value "0" to the adder node 62, and hence the contents of the masking counter register 58 remains constant, not being further incremented. Consequently, the masking circuit 41 is triggered whenever a step of the user is detected and inhibits detection of further steps for a time interval equal to $N_M$ cycles of the clock signal.

Figure 12:
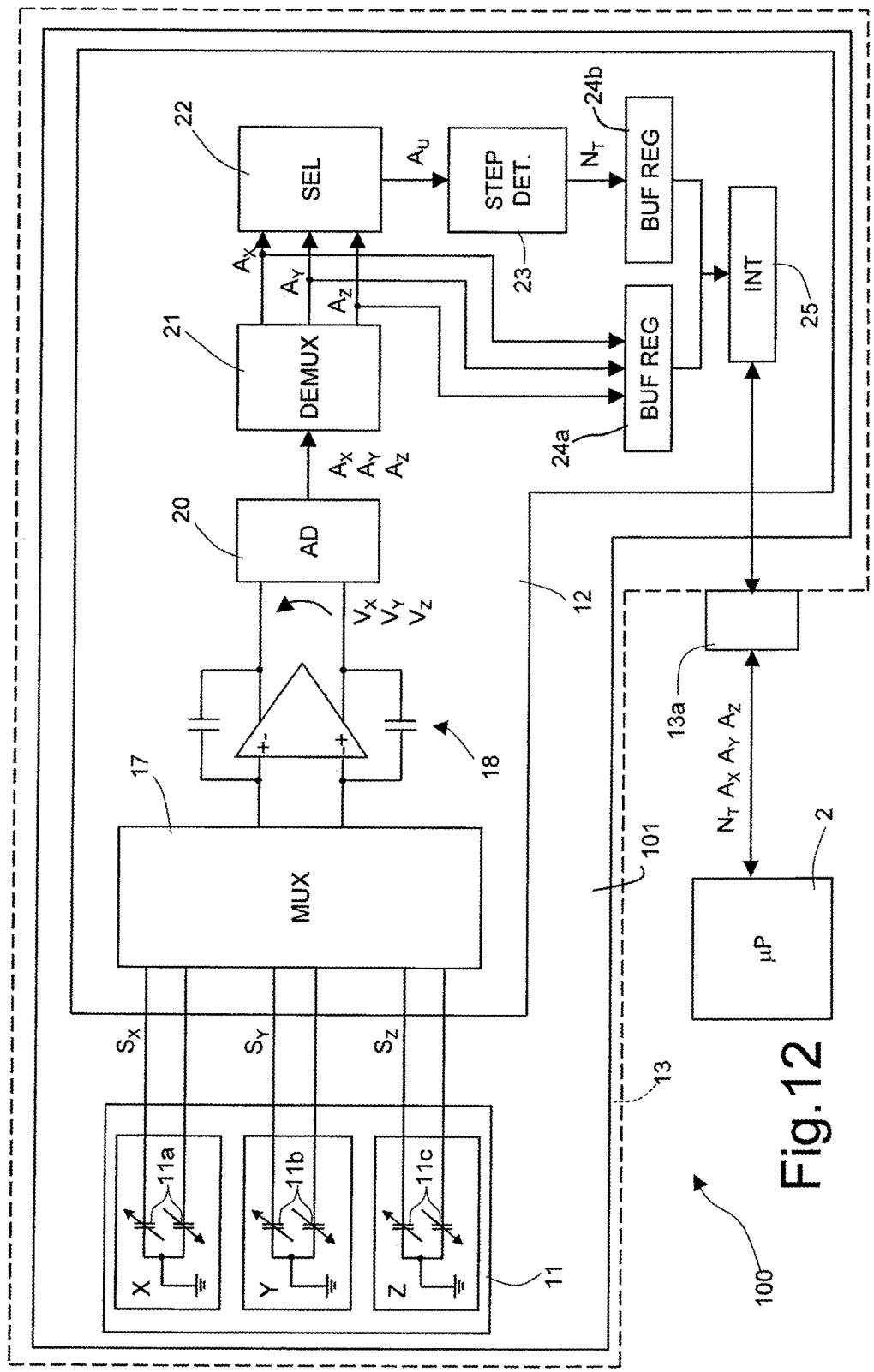
FIG. 12 is a simplified block diagram of an inertial device built in accordance with a second embodiment of the present invention.

According to a different embodiment of the invention, illustrated in FIG. 12, in which parts that have already been illustrated are designated by the same reference numbers, in a pedometer 100 the inertial sensor 11 and the processing unit 12 are provided in a single semiconductor chip 101, in addition to being both encapsulated within the same package 13.

The inertial device has the advantage of being immediately integratable in a generic portable electronic appliance, such as a cell phone or a palmtop, without occupying the computation resources available to the portable electronic appliance itself. In particular, the microprocessor (or other independent control unit of the portable electronic appliance) does not need to undertake any type of supplementary processing, because the number of steps counted can be directly detected by the pedometer. There are thus prevented both slowing-down in the execution of the functions associated to the portable electronic appliance and errors in counting of the steps on account of possible conflicts and temporary interruptions of the necessary control functions.

Finally, it is evident that modifications and variations may be made to the inertial device and to the portable electronic appliance described herein, without departing from the scope of the present invention as defined in the annexed claims. In particular, the pedometer could integrate further functions in addition to the ones described and carry out counting of the steps in a way that is at least in part different. Furthermore, it is evident that the circuits that implement the various control functions (detection, counting, threshold adaptation, masking etc.) may have a structure different from the one described and be made up of equivalent alternative solutions.

The invention claimed is:

1. A method to generate a number of steps in a generic portable electronic appliance system, the generic portable electronic appliance system having one or more processors, memory, and a single integrated circuit package encapsulating both an inertial sensor formed on a first integrated circuit chip and a processing unit formed on a second integrated circuit chip, the first integrated circuit chip being separate and distinct from the second integrated circuit chip, the processing unit associated with the inertial sensor, the method comprising:

generating at least one raw acceleration signal with the inertial sensor in response to accelerations produced when a user of the generic portable electronic appliance system walks; and counting, with the processing unit, a number of steps of the user based on the raw acceleration signal.

2. The method of claim 1, wherein generating the at least one raw acceleration signal includes generating three raw acceleration signals, the three raw acceleration signals representing motion in three mutually perpendicular directions.

3. The method of claim 2, wherein the three raw acceleration signals are independent of each other.

4. The method of claim 2, wherein a first of the three raw acceleration signals represents acceleration along a first detection axis X, a second of the three raw acceleration signals represents acceleration along a second detection axis Y, and a third of the three raw acceleration signals represents acceleration along a third detection axis Z.

5. The method of claim 1, wherein generating the at least one raw acceleration signal comprises:

detecting a change in capacitance, the change in capacitance responsive to at least one force acting on the inertial sensor.

6. The method of claim 5, wherein the change in capacitance is caused by a movable part of the inertial sensor moving relative to a fixed part of the inertial sensor.

7. The method of claim 1, wherein generating the at least one raw acceleration signal comprises:

detecting motion with a biaxial linear accelerometer, the biaxial linear accelerometer having comb-fingered electrodes.

8. The method of claim 7, wherein generating the at least one raw acceleration signal comprises:

detecting motion with a single-axis accelerometer, the single-axis accelerometer having a hinged beam and a fixed body.

9. The method of claim 1, comprising:

cyclically coupling each raw acceleration signal of the at least one raw acceleration signal to a charge integrator;

passing a voltage signal from the charge integrator to an analog-to-digital converter circuit; and detecting a plurality of step-events with a detection circuit, each step-event representing an identified step of the user.

10. The method of claim 1, comprising:

passing the number of steps to the one or more processors; and presenting the number of steps to the user on a display coupled to the one or more processors.

11. A method to generate a number of steps in a cell phone, the cell phone having a processor, memory, an image sensor, a display, and a pedometer, the pedometer formed in a single integrated circuit package encapsulating both an inertial sensor formed on a first integrated circuit die and a processing unit formed on a second integrated circuit die, the second integrated circuit die being separate and distinct from the first integrated circuit die, the processing unit associated with the inertial sensor, the method comprising:

generating a number of steps with the pedometer, each step of the number of steps generated in response to accelerations produced when a user of the cell phone walks, the number of steps generated absent any processing of the processor; and passing the number of steps to the processor.

12. The method of claim 11, comprising:

presenting the number of steps to the outside world.

13. The method of claim 12, wherein presenting the number of steps to the outside world comprises:

communicating the number of steps via a receiving/transmitting circuit of the cell phone.

14. The method of claim 11, wherein passing the number of steps to the processor includes communicating the number of steps via a connection terminal coupling the pedometer to the processor.

15. The method of claim 11, comprising:

generating at least one of an estimated speed, a total distance covered, and an estimated energy consumption based on the number of steps.

16. The method of claim 11, comprising:

activating the pedometer by the processor.

17. A generic portable electronic appliance device, comprising:

at least one processor;

memory coupled to the at least one processor; and a single integrated circuit package pedometer encapsulating both an inertial sensor formed on a first integrated circuit chip and a processing unit formed on a second integrated circuit chip separate and distinct from the first integrated circuit chip, the processing unit associated with the inertial sensor, the processing unit coupled to the at least one processor via a communication interface arranged to pass a number of steps taken by a user associated with the generic portable electronic appliance device.

18. The generic portable electronic appliance device of claim 17, wherein the generic portable electronic appliance device is a cell phone.

19. The generic portable electronic appliance device of claim 17, comprising:

a display;

a receiving/transmitting circuit; and an image sensor, wherein each of the display, the receiving/transmitting circuit, and the image sensor are coupled to the at least one processor.

20. The generic portable electronic appliance device of claim 17, wherein the communication interface comprises:

a connection terminal.

21. The generic portable electronic appliance device of claim 17, wherein the processing unit of the generic portable electronic appliance device is further arranged to pass, via the communication interface, data regarding the gait of the user.

* * * * *